United States Patent [19]

Castelli

[11] Patent Number: 4,894,066

[45] Date of Patent: Jan. 16, 1990

[54] METHOD TO PRODUCE FUEL FROM SOLID URBAN REFUSE, THE METHOD INCLUDING ALSO AN ORGANIC COMPOSTED FRACTION

[75] Inventor: Luigi Castelli, Trieste, Italy

[73] Assignee: Daneco Danieli Ecologia SpA, San Giovanni Al Natisone, Italy

[21] Appl. No.: 183,221

[22] Filed: Apr. 19, 1988

[30] Foreign Application Priority Data

Apr. 28, 1987 [IT] Italy ............................ 83365 A/87

[51] Int. Cl.$^4$ ............................ C10L 5/40; C10L 5/00
[52] U.S. Cl. ............................ 44/589; 44/605
[58] Field of Search ............................ 44/589, 605, 628

[56] References Cited

U.S. PATENT DOCUMENTS 3,910,775 10/1975 Jackman ............................ 44/589
4,043,764 8/1977 Loas ............................ 44/589

FOREIGN PATENT DOCUMENTS 58128 8/1982 European Pat. Off. ............ 44/589
1018519 1/1966 United Kingdom ............ 44/589
83102779 8/1983 World Int. Prop. O. ............ 44/589

OTHER PUBLICATIONS

Michael J. Suess (Ed.), *Solid Waste Management—Selected Topics*, Who 1985, pp. 57–58.
*Webster's New World Dictionary* (2nd College Ed.), 1978, p. 1342.

Primary Examiner—Carl F. Dees
Attorney, Agent, or Firm—Wegner & Bretschneider

[57] ABSTRACT

Method to produce fuel from solid urban refuse, a traditional alternative fuel, which is known as "refuse derived fuel", being mixed in desired quantities with dry, mature compost.

5 Claims, No Drawings

METHOD TO PRODUCE FUEL FROM SOLID URBAN REFUSE, THE METHOD INCLUDING ALSO AN ORGANIC COMPOSTED FRACTION

FIELD OF APPLICATION

This invention concerns the production of fuel from solid urban refuse, the method covering also an organic composted fraction.

STATE OF THE ART

A technology is known which is employed in the production of an alternative fuel called for short hereinafter "R.D.F."(Refuse Derived Fuel), the technology starting with solid urban refuse.

In general, this technology provides also for one or more of the following refining operations having the purpose of increasing the calorific value of the product and reducing its content of undesired substances. These operations are substantially as follows:

drying, separation of glass, other inert materials and non-ferrous metals, separation of ferrous metals, separation of chlorinated plastics (PVC), and separation of the organic fraction having a low calorific value.

The known technology arranges in general to discard the organic fraction, with a consequent loss of product.

It is also known that the organic fraction, whether composted or not, cannot always be employed as an organic fertilizer to correct the soil conditions, above all where the demand for compost on the local market is not great enough or when transient conditions require a lower production of compost.

Problems of disposal of this organic fraction having a low calorific value therefore arise and in certain cases become very serious.

DESCRIPTION OF THE INVENTION

The present applicant has therefore studied, tested and obtained a method for the production of fuel, starting with solid urban refuse, whereby the fuel produced contains also a composted organic fraction.

According to the invention the innovation consists precisely also in the employment of an organic fraction with a low calorific value in the production of an alternative fuel called "R.D.F.", the organic fraction having undergone a composting process.

According to the method of the invention the composting process, which is advantageously carried out with an accelerated forced-draught system, enables a plurality of advantages to be obtained.

A first advantage is the stabilisation of the organic substance and the elimination of its unpleasant smell.

Another advantage is the pasteurisation of the material owing to its self-production of heat during air-stream-induced fermentation.

A further advantage is the increase in calorific value owing to the drying caused by the forced draught.

In general it is best to separate from the solid urban refuse the following two fractions, namely the light fraction with a high calorific value and the heavy fraction having a high content of organic substance, and to mix them after the latter fraction has undergone the composting process.

However, it may be best in some cases that the whole mass of refuse should undergo the composting process after a possible trituration process without carrying out any prior sorting. In this case the subsequent mixing step will, of course, be obviated.

According to the invention the separation of inert materials may take place before or after the composting step.

If prior sorting is carried out, the end product is obtained by mixing the loose or compacted R.D.F. produced by conventional processes with the dry, mature compost.

Such mixing takes place in a normal mixing machine or in another way.

When briquetting, compacting or pelletisation of the end product is required, the necessary equipment for the purpose is provided and is fed with pre-mixed compost and R.D.F.

According to the invention, as such mixture is less humid than traditional R.D.F., the briquetting or pelletisation operations are rendered much easier and can be performed without prior drying.

The invention is therefore obtained with a method to produce fuel from solid urban refuse, the method being characterized in that a traditional alternative fuel, which is known as "refuse derived fuel", is mixed in desired quantities with dry, mature compost.

I claim:

1. A method for producing fuel from solid urban refuse, comprising composting the organic fraction of the refuse with an accelerated forced-draught system, and mixing the composted organic fraction with dry, mature compost.

2. A method as recited in claim 1, further comprising separating inert material in the refuse from the organic fraction before said composting of the organic fraction.

3. A method as recited in claim 1, further comprising separating inert material in the refuse from the organic fraction after said composting of the organic fraction.

4. A method as recited in claim 1, further comprising refining the refuse.

5. A method as recited in claim 4, wherein said refining is carried out before said composting.

* * * * *